United States Patent [19]

Neumann et al.

[11] Patent Number: 4,524,640
[45] Date of Patent: Jun. 25, 1985

[54] INTEGRAL HOLDOUT RING AND SPRING RETAINER FOR DIFFERENTIALS

[75] Inventors: Lawrence T. Neumann, Troy; Walter L. Dissett, Southfield, both of Mich.

[73] Assignee: Tractech, Inc., Warren, Mich.

[21] Appl. No.: 319,961

[22] Filed: Nov. 10, 1981

[51] Int. Cl.³ .............................................. F16H 35/04
[52] U.S. Cl. .......................................... 74/650; 192/50
[58] Field of Search ...................... 74/650, 711; 192/50

[56] References Cited

U.S. PATENT DOCUMENTS

| 2,329,059 | 9/1943 | Knoblock | 74/650 |
| 2,638,794 | 8/1952 | Knoblock | 74/650 |
| 2,667,087 | 1/1954 | Myers | 74/650 |
| 2,830,466 | 4/1958 | Myers | 74/650 |
| 3,397,593 | 8/1968 | Knoblock | 74/650 |
| 3,791,238 | 2/1974 | Bokovoy | 74/650 |
| 4,424,725 | 1/1984 | Bawks | 74/650 |

Primary Examiner—Allan D. Herrmann
Assistant Examiner—Joseph M. Rolnicki
Attorney, Agent, or Firm—Laubscher Philpitt & Laubscher

[57] ABSTRACT

An improved differential mechanism of the holdout ring type is disclosed, characterized in that the annular holdout rings are mounted concentrically between the driven clutch members and the associated side gears, respectively, and the device for biasing the driven clutch members toward engagement with the driving spider member arranged therebetween includes a pair of compression springs mounted concentrically between the holdout rings and the side gears. Each holdout ring includes an outer flange portion that is rotatably received within a corresponding groove contained in the associated driven clutch member, a plurality of circumferentially spaced holdout lugs that cooperate with the center cam member, a tubular central portion that extends in concentrically spaced relation between the center cam member and the associated side gear, and a radially inwardly directed inner spring retainer flange portion carried by the free extremity of the tubular portion and against which one end of the compression biasing spring reacts.

1 Claim, 8 Drawing Figures

INTEGRAL HOLDOUT RING AND SPRING RETAINER FOR DIFFERENTIALS

REFERENCE TO RELATED APPLICATION

This is a companion application to the prior U.S. Pat. No. 4,424,725 issued Jan. 10, 1984 in the name of James R. Bawks entitled "Locking Differential Mechanism with Improved Holdout Ring and Spring Retainer".

BRIEF DESCRIPTION OF PRIOR ART

Differential mechanisms of the holdout ring type are well known in the patented prior art, as evidenced by the U.S. Pat. Nos. 2,638,794 and 3,397,593, to Knoblock and Bokovoy U.S. Pat. No. 3,791,238, for example. In such differentials, upon the overrunning of one output shaft relative to the other, the driven clutch member associated with the overrunning shaft is disengaged from the driving spider member by center cam means, an associated holdout ring being rotated slightly from an inoperative position to an operative position to maintain the driven clutch member disengaged until the overrunning condition is terminated.

In the aforementioned Bawks U.S. Pat. No. 4,424,725, an improved differential mechanism is disclosed wherein the holdout rings of the differential mechanism are concentrically arranged between the driven clutch members and the side gears, respectively, and the compression biasing springs are concentrically arranged between the holdout rings and the side gears, respectively, whereby the size, weight and cost of the assembly are reduced, together with a reduction in the size and cost of the compression springs. Associated with the holdout rings are a pair of annular spring retainer elements that are mounted in concentrically spaced relation between the holdout rings and the side gears, respectively.

SUMMARY OF THE INVENTION

The present invention was developed to further simplify the differential mechanism by reducing the number of parts for ease of assembly and reduction in cost, and further to strengthen the holdout ring means and thereby improve the durability of the apparatus.

In accordance with a primary object of the invention, the holdout rings are structurally strengthened by the provision of spring retainer flange portions, whereby not only is the durability and life of the holdout operation improved, but also the necessity of separate retainer elements is eliminated. More particularly, each holdout ring is formed of an annular resilient body that is slit axially into a generally C-shaped configuration, which body is resiliently biased radially outwardly into frictional engagement with the inner circumferential surface of the associated driven clutch member. The holdout ring includes at one end an outer annular flange portion that extends within a corresponding groove contained in the inner surface of the driven clutch member, whereby the holdout ring is connected for rotational movement, but is retained against axial displacement, relative to the associated driven clutch member. In addition to the circumferentially spaced holdout lugs that cooperate with the center cam member to disengage the driven clutch member when the associated wheel is in an overrunning condition, the holdout ring includes a central tubular portion that extends axially inwardly toward the other holdout ring in concentrically spaced relation about the associated side gear. At its free extremity, the tubular portion is provided with a radially inwardly directed retainer spring flange portion. Thus, the associated helical biasing spring that is mounted concentrically about the side gear and is compressed between the side gear and the retainer spring flange in the holdout ring biases the holdout ring and the associated driven clutch member in the clutch-engaging direction relative to the central driving spider. While preferably the holdout ring is formed by stamping procedures, other manufacturing processes could be followed in producing the resilient holdout rings.

BRIEF DESCRIPTION OF THE DRAWINGS

Other objects and advantages of the invention will become apparent from a study of the following specification, when viewed in the light of the accompanying drawing, in which.

DETAILED DESCRIPTION

Figures 1, 2, 3, 4:
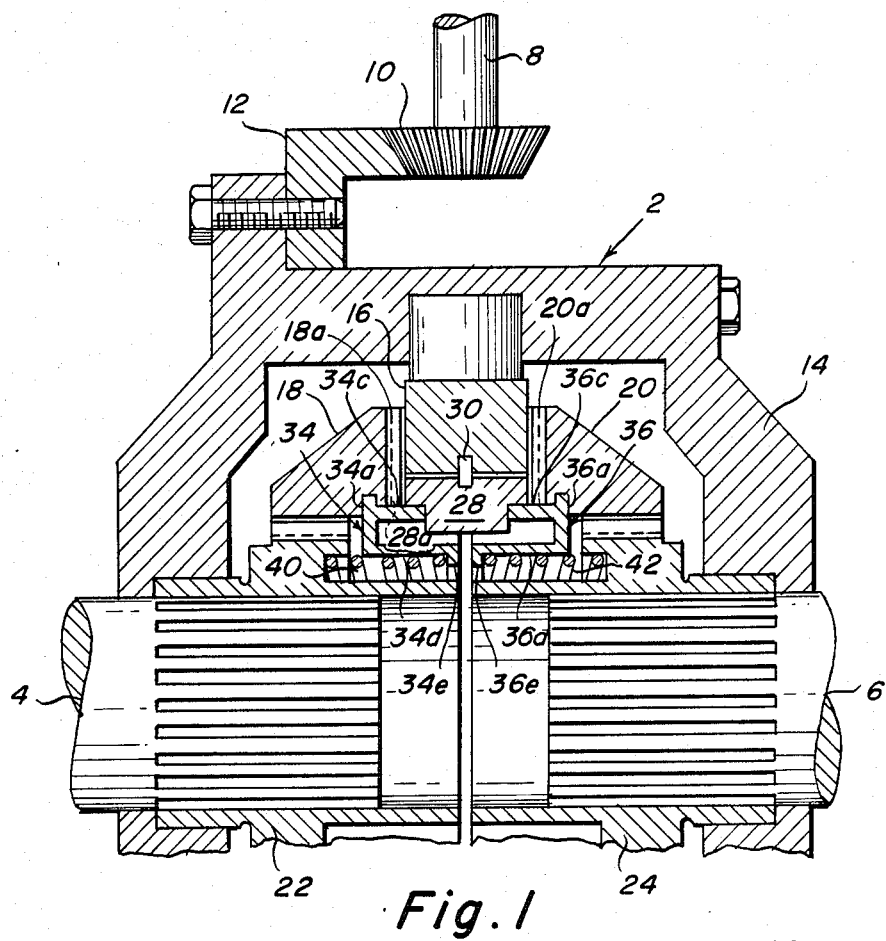
FIG. 1 is a longitudinal sectional view of the differential apparatus of the present invention.
FIG. 2 is an elevational end view of the center cam member of FIG. 1.
FIGS. 3 and 4 are sectional views taken along lines 3—3 and 4—4, respectively, of FIG. 2.
Figure 5:
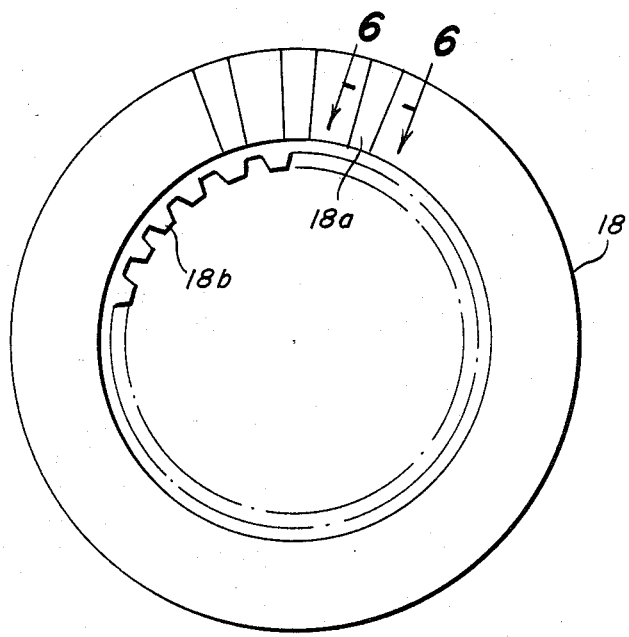
FIG. 5 is an end view of one of the clutches of FIG. 1.
Figure 6:
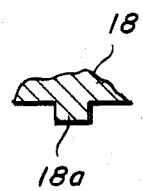
FIG. 6 is a sectional view taken along line 6—6 of FIG. 5.

Referring more particularly to FIG. 1, the differential apparatus 2 of the present invention is operable to drive a pair of output or driven shafts 4 and 6 from an input or driving shaft 8 via pinion drive gear 10, ring gear 12, sectional casing 14, an annular driving member 16 non-rotatably mounted within the casing 14, and a pair of driven clutch members 18 and 20 that are splined for axial displacement on side gears 22 and 24 that are non-rotatably connected with the output shafts 4 and 6, respectively. Mounted concentrically within the spider driving member 16 is a center cam member 28 that is retained against relative axial displacement by the resilient split snap ring 30. The driven clutch member 18 has teeth 18a having the cross-sectional configuration shown in FIG. 6, which teeth correspond in number and cross-sectional configuration to corresponding teeth on the spider drive member 16. Similarly, the driven clutch member 20 has clutch teeth of similar configuration for engagement with corresponding teeth on the adjacent face of the spider driving member 16. Splines 18b on the axially displaceable clutch member 18 engage corresponding splines on the side gear 22, and a similar splined connection is afforded between clutch member 20 and side gear 24.

Figure 7:
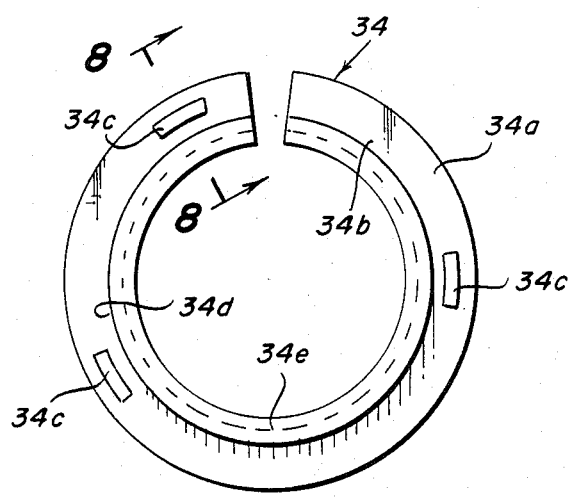
FIG. 7 is an end view of one of the holdout rings of FIG. 1.
Figure 8:
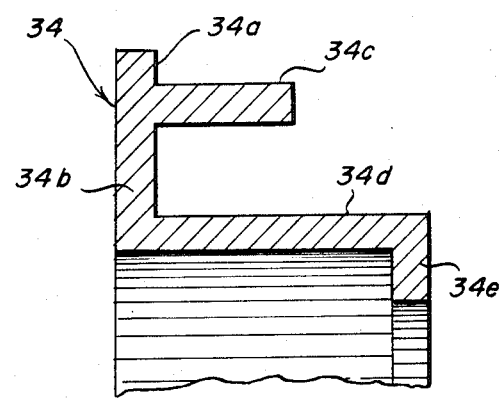
FIG. 8 is a sectional view taken along line 8—8 of FIG. 7.

In accordance with the present invention, a pair of identical generally-annular split resilient holdout rings 34 and 36 are mounted concentrically within, and are resiliently biased radially outwardly into frictional engagement with, the corresponding driven clutch members 18 and 20, respectively as disclosed in FIGS. 1, 7 and 8, the holdout ring 34 includes a radially outwardly directed body portion 34b terminating in an annular flange portion 34a that is received in a continuous groove contained in the inner circumferential surface of the driven clutch member 18, whereby the holdout ring is rotatably connected with the clutch member 18 but is retained against axial displacement relative thereto. The holdout ring body portion 34b carries a plurality of circumferentially spaced lug portions 34c that extend axially within corresponding through slots 28b contained in the inner peripheral surface of the center cam member. The other holdout ring 36 is similarly provided with radially outwardly directed body and flange portions, respectively, and with a plurality of circumferentially-spaced lug portions 36c that extend axially within the other ends of the through slots 28b contained in the center cam member. As shown in FIG. 4, the slots 28b have a stepped cross-sectional configuration defining shoulders 28c. The center cam member 28 has at each end teeth 28a that normally engage the teeth of the driven clutch members 18 and 20, respectively. As shown in FIG. 3, the center cam teeth 28a have a different cross-sectional configuration than those of the driven clutch members, thereby to effect disengagement of the driven clutch member associated with an overrunning output shaft, as will be discussed in greater detail below.

The split resilient holdout rings further include aligned generally-tubular portions 34d and 36d that extend axially toward each other in concentrically spaced relation about the adjacent ends of the side gears 22 and 24 and the output shafts 4 and 6, respectively. At their adjacent ends, the holdout rings are provided with radially inwardly directed retainer flange portions 34e and 36e, respectively. Moreover, as shown in FIG. 1, at their remote ends, the radially outwardly directed body and flange portions, and the corresponding grooves in the clutch members, are contained in common radial planes that include the ends of the associated tubular portions, respectively. The holdout rings 34, 36 are preferably formed by stamping, but other manufacturing techniques might be used as well.

The driven clutch members 18 and 20 are normally biased inwardly toward teeth-enmeshing engagement with the spider driving member 16 by compression springs 40 and 42 that are concentrically arranged about the adjacent ends of the side gears 22 and 24, respectively. At their remote ends, the springs engage fixed shoulders on the associated side gears, and at their adjacent ends, the springs transmit the desired inwardly directed biasing force of the driven clutch members 18 and 20 via the annular retaining flanges 34e and 36e on the holdout rings 34 and 36, respectively.

OPERATION

In operation, as long as the output shafts 4 and 6 are driven at the same rotational velocity, driving torque is transmitted from input drive shaft 8 to the output driven shafts 4 and 6 via pinion 10, ring gear 12, casing 14, spider driving member 16, driven clutch members 18 and 20, and side gears 22 and 24, respectively. The holdout rings 34 and 36 are now in inoperable positions in which the lugs thereon extend axially within the central portions of the through slots 28b contained in the center cam member. The teeth on the driven clutch members 18 and 20 are in enmeshing engagement with the corresponding teeth on both the spider member 16 and the center cam member 28.

Assume now that the left hand shaft 4 overruns the right hand shaft 6 (such as during a turn, for example). Owing to the configuration of the left hand teeth 28a of the center cam member relative to the configuration of the teeth of the left hand driven clutch member 18, the driven clutch member 18 is progressively shifted to the left relative to side gear 22 against the biasing force of spring 40, thereby to effect disengagement between the driving teeth of spider member 16 and the teeth of driven member 18. Upon disengagement of the driven clutch member 18, relative rotational displacement between spider member 16 and driven clutch member 18 causes holdout ring 34 (which is in frictional engagement with driven clutch member 18) to be rotationally displaced to the operative position illustrated in phantom in FIG. 4, whereupon the free extremity of the lug portion 34c is seated upon the shoulder surface 28c of the slot 28b contained in the center cam member, thereby retaining the clutch member 18 in a disengaged chatter-free condition.

When the speed of the overrunning shaft 4 is returned to that of the other output shaft 6 (turn completed), the holdout ring is frictionally displaced to the inoperable position relative to the slots contained in the center cam member, whereupon driven clutch member 18 is shifted to the right into teeth enmeshing engagement with the driving spider member 16.

The right hand holdout ring 36 operates in a similar fashion in the event that the right hand output shaft 6 achieves an overrunning condition.

While in accordance with the provisions of the Patent Statutes the preferred form and embodiment of the invention has been illustrated and described, it will be apparent that other changes and modifications may be made without deviating from the invention set forth above.

What is claimed is:

1. In a differential mechanism including a pair of colinearly aligned output shafts (4,6) having spaced adjacent ends; an annular spider driving member (16) arranged in concentrically spaced relation about said output shaft adjacent ends; clutch means normally effecting a driving connection between said driving member and said output shafts, respectively, said clutch means including a pair of annular side gears (22, 24) non-rotatably mounted on the adjacent ends of said output shafts, respectively, a pair of annular driven clutch members (18, 20) mounted on said side gears for axial displacement on opposite sides of said driving member, respectively, said clutch member having inner circumferential surfaces, and spring means (40, 42) biasing said driven clutch members axially inwardly toward clutch-engaging positions relative to said driving member, respectively; means including an annular center cam member (28) concentrically mounted within, and rotatably connected with, said driving member, said center cam member being operable when one of said output shafts overruns the other for disengaging from said driving member the driven clutch member associated with said overrunning shaft; and holdout ring means (34, 36) for maintaining said associated driven clutch member in the disengaged condition as long as said one output shaft overruns the other shaft; the improvement wherein (A) said holdout ring means comprises a pair of generally annular axially-split resilient holdout rings (34, 36) arranged on opposite sides of said center cam member and extending at their remote ends concentrically between said driven clutch members and said side gears, respectively, said holdout rings being resiliently biased radially outwardly into frictional engagement with said inner circumferential surfaces of said driven clutch members, respectively, each of said holdout rings including
  (1) a tubular portion (34d, 36d) having first and second ends arranged in concentrically spaced relation within said central cam member and the associated clutch member, respectively;
  (2) an annular radial body portion (34b, 36b) that extends radially outwardly from said second end of said tubular portion adjacent and in frictional engagement with the associated clutch member, said radial body portion terminating adjacent its outer periphery in a flange portion (34a, 36a) that extends within a corresponding groove contained in said inner circumferential surface of the associated clutch member, whereby said holdout rings are connected for frictionally resisted angular displacement relative to, but are retained against axial displacement with respect to, the associated driven clutch member, respectively;
  (3) a plurality of circumferentially spaced integral holdout lugs (34c, 36c) extending axially from said radial body portion adjacent said center cam member, said holdout lugs extending axially with corresponding slots contained in the ends of said center cam member, respectively, said slots having in longitudinal cross-section a configuration defining holdout shoulders, said lugs being so dimensioned and having such a configuration that when one of the shafts is in an overruning condition, the associated holdout ring is slightly axially and angularly displaced relative to the central cam member from an inoperable central position relative to the associated slot to an operable holdout position on one of said shoulders in which the associated driven clutch member is maintained disengaged from said spider driving member; and
  (4) a radially inwardly directed annular spring retainer flange (34e, 36e) carried by said first end of said tubular portion adjacent said center cam member;
(B) said spring means comprising a pair of compression springs (40, 42) mounted concentrically intermedicate said holdout rings and said side gears, respectively, each of said spring means reacting at opposite ends with the associated side gear and with the spring retainer flange on the associated holdout ring, respectively, thereby to bias said driven clutch members axially inwardly toward engagement with said spider means.

* * * * *